United States Patent

[11] 3,616,059

[72] Inventor  Larry C. Frazier
              Sun City, Ariz.
[21] Appl. No. 736,363
[22] Filed     June 12, 1968
[45] Patented  Oct. 26, 1971
[73] Assignee  National-Standard Company
               Niles, Mich.

[54] APPARATUS FOR ENCASING BEADS INTO A TIRE
     15 Claims, 2 Drawing Figs.
[52] U.S. Cl. .................................................. 156/401,
                                              156/403, 156/417
[51] Int. Cl. ........................................... B29h 17/22,
                                                       B29h 17/26
[50] Field of Search ......................................... 156/131,
              132, 135, 136, 398–401, 403, 460, 415, 417

[56]                  References Cited
                  UNITED STATES PATENTS

| | | | |
|---|---|---|---|
| 3,127,294 | 3/1964 | Porter ........................... | 156/401 |
| 3,237,199 | 2/1966 | Bray .............................. | 156/128 |
| 3,265,549 | 8/1966 | Woodhall et al. ............. | 156/132 |
| 3,414,446 | 12/1968 | Pearce et al. .................. | 156/128 |
| 3,438,832 | 4/1969 | Cantarutti ..................... | 156/132 |
| 3,475,254 | 10/1969 | Henley .......................... | 156/403 |
| 3,485,692 | 12/1969 | Frazier .......................... | 156/123 |
| 3,490,980 | 8/1969 | Mallory et al. ................. | 156/132 |

*Primary Examiner*—Benjamin A. Borchelt
*Assistant Examiner*—Stephen C. Bentley
*Attorney*—Johnson, Dienner, Emrich, Verbeck & Wagner

ABSTRACT: Apparatus for building pneumatic tires embodying an intermediate assembly and an end assembly at each end of the intermediate assembly for supporting tire carcass material initially in the form of a tubular cylinder, each of the end assemblies embodying bead shoulder forming means for displacing the tire carcass material radially outwardly to form bead shoulders against bead setter means position and hold tire beads against axial movement toward each other and in concentric outwardly spaced relation with respect to the carcass material, ply turnup means for encasing the tire beads at the bead shoulders, and in which the intermediate supporting members movable radially and circumferentially relative to each other to form the tire carcass material into substantially torus configuration upon releasing of the tire beads by the bead shoulder-forming means for axial movement of the tire beads axially toward each other.

Method of building pneumatic tires in which tire carcass material is initially formed into a tubular cylinder after which radially outwardly extending tire bead shoulders are then formed inwardly of the ends of the tubular cylinder, and against which tire beads are held against axial movement toward each other arm in fixed concentric outwardly spaced relation, followed by encasing major portions of the tire beads by displacing end portions of the tire carcass material while the tire beads are held concentrically against the bead shoulders, concentrically freeing the tire beads and fully encasing the same by turning up the remaining end portions of the tire carcass material while the tire beads are engaged with the tire bead shoulders, and then predeterminately releasing the encased tire beads for axial movement toward each other in forming the tire carcass material into substantially torus configuration.

APPARATUS FOR ENCASING BEADS INTO A TIRE

The present invention relates to the pneumatic tire building art and is connected with the building of tires starting with tire carcass material of tubular cylindrical configuration. The tire carcass material may be of a character for building conventional bias angle tires but, if desired, the apparatus may also be used for assembling tire beads with carcass material for radial tires.

The invention resides in an arrangement of an intermediate assembly characterized by a plurality of interleaved intermediate supporting members movable radially inwardly or outwardly and circumferentially relative to each other and end assemblies, one at each end of the intermediate assembly, which together in the radial inward positions of the intermediate supporting members define a cylindrical supporting surface for supporting tire carcass material in the form of a tubular cylinder. In the outer radial positions of the intermediate supporting members the tubular cylinder of tire carcass material is formed into substantially torus configuration approximating that of a completed tire.

The aforementioned end assemblies each comprise an end frame which provides for the support of tire bead shoulder forming means for radially displacing the tire carcass material to form tire bead shoulders inwardly of the ends of the tubular cylinder of tire carcass material. The apparatus further incorporates tire bead setting means for applying tire beads against the tire bead shoulders to support the tire beads in concentric and outwardly spaced relation with respect to the cylindrical surface of the tubular cylinder of tire carcass material. With the tire beads held in the aforementioned position, the invention further comprehends the provision of ply turnup means for turning up end portions of the tire carcass material to initially encase a major portion of the tire beads, after which the bead setting means is released from the tire beads and the end portions of the tire carcass material further turned up by the ply turnup means to completely encase the tire beads. Preferably, the tire bead shoulder forming means are retained in position displacing the tire carcass material to provide a firm supporting surface for the application of other components such as chafer strips and sidewalls to the tire carcass material. After applying such other components radial outward displacement of the intermediate assembly is initiated to tension, the tire carcass material between the shoulder forming means and the intermediate assembly after such initial tensioning of the tire carcass material the tire bead shoulder forming means are returned to their initial or starting positions so that upon continued radial outward displacement of the intermediate supporting member the embedded tire beads are released as the tire carcass material is formed into torus configuration.

An important object of the invention resides in supporting the tire beads against the tire bead shoulders in concentric spaced relation with respect to the tubular cylinder of the tire carcass material to enable displacing end portions of the tubular cylinder to encase major portions of the tire beads, and after release of the tire beads, to further displace the end portions of the tire carcass material to fully encase the tire beads. The tire beads thus encased in the tire carcass material, preferably after application of other components such as chafer strips and sidewalls and after slight tensioning of the carcass material between the tire beads and the intermediate portion of the tire carcass material between the tire beads and the intermediate portion of the tire carcass material, are freely movable axially toward each other after the tire bead shoulder forming means are returned to their initial positions, enabling formation of the tire carcass material into substantially torus configuration by radial outward displacement of the intermediate supporting members of the intermediate assembly.

It is known in the art to displace tire carcass material in the form of a tubular cylinder into a toruslike configuration by means of an inflatable bag of resilient material or by an intermediate assembly defined by the aforementioned plurality of interleaved intermediate supporting members movable radially inwardly and outwardly between inner and outer end positions and circumferentially relative to each other. In such known arrangements end head assemblies are provided which are movable axially toward and away from each other in the displacement of the tire carcass material into torus configuration, and complex structural components are associated with the end head assemblies for controlling the positions of the tire beads to provide a tire in which the tire beads are accurately assembled in the tire carcass material.

An important feature of the present invention resides in the manner in which the tire beads are incorporated in the tire carcass material providing for free relative axial movement of the tire beads toward each other in displacement of the tire carcass material into torus configuration to the end of accurately assembling the tire beads with the tire carcass.

The foregoing concept of the present invention of incorporating tire beads, and other components of a tire with tire carcass material and providing for the free axial movement of the tire beads toward each other in the displacement of the carcass material into torus configuration, enables the provision of simple apparatus of a few parts and which is extremely accurate and simple in operation.

A further feature of the invention is the incorporation of a plurality of bead segment members lying circumferentially outwardly of the end assemblies having inner end portions for holding tire beads against the tire bead shoulders in concentric spaced relation with the outer surface of the tubular cylinder and in which position ply turnup means are actuated to initially displace outer end portions of the carcass material to encase major portions of the tire beads, and thereafter effect the completion of ply turnups to fully encase the beads.

A further preferred feature of the invention resides in the provision of means for adjusting the positions of the end frames of the apparatus to provide for predetermined spaced-apart tire bead shoulders in the tire carcass material.

A further preferred feature resides in providing the aforementioned end frames with annular supporting portions defining, in part, a cylindrical surface for initially forming the tire carcass material into tubular cylindrical configuration.

A still further feature resides in the provision of gap shield means for association with the annular supporting portions of the end frames which together in part define the aforementioned cylindrical supporting surface for the tire carcass material.

A still further preferred feature resides in providing for the adjustable disposition of the gap shield means and the annular supporting portions of the end frames for supporting the tire carcass material and permitting a broad range of predetermined spaced apart relations for the setting of tire beads with respect to the tire carcass material.

A further preferred feature resides in providing the intermediate assembly with detachable intermediate supporting members to provide a predetermined width to the intermediate assembly in the radial outer positions of the intermediate supporting members.

A further important feature of the invention resides in a provision of gap shield frame means for supporting gap shield means movable axially relative between the intermediate assembly and the end assemblies permitting the provision of a shoulder construction for the intermediate assembly to enable the stitching of tread wings of a tread to a tire carcass in the radial outer positions of the intermediate supporting members.

The above and other objects and features of the invention will appear from the following detailed description of a preferred embodiment of the invention shown in the accompanied drawings in which.

Figure 1A:
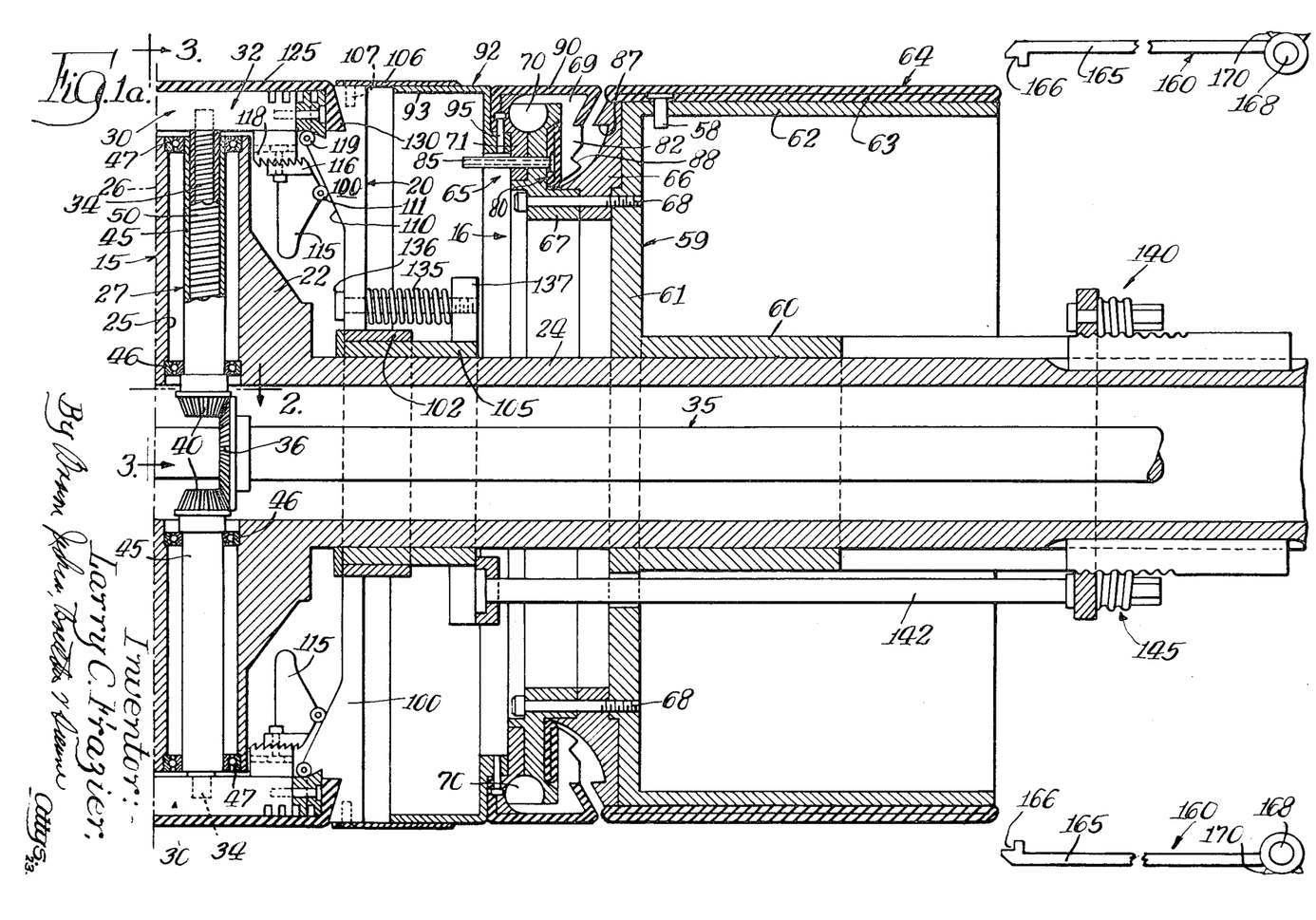
FIGS. 1*a* and 1*b* joined on the dot-dash center lines show longitudinal vertical sections, the right and left-hand portions, respectively, of a pneumatic tire building apparatus of the invention with certain parts being shown in elevation, and in which an intermediate assembly and end assemblies of the apparatus are in positions defining a cylindrical surface for supporting tire carcass material in the form of a tubular cylinder therearound.
Figures 1B, 2:
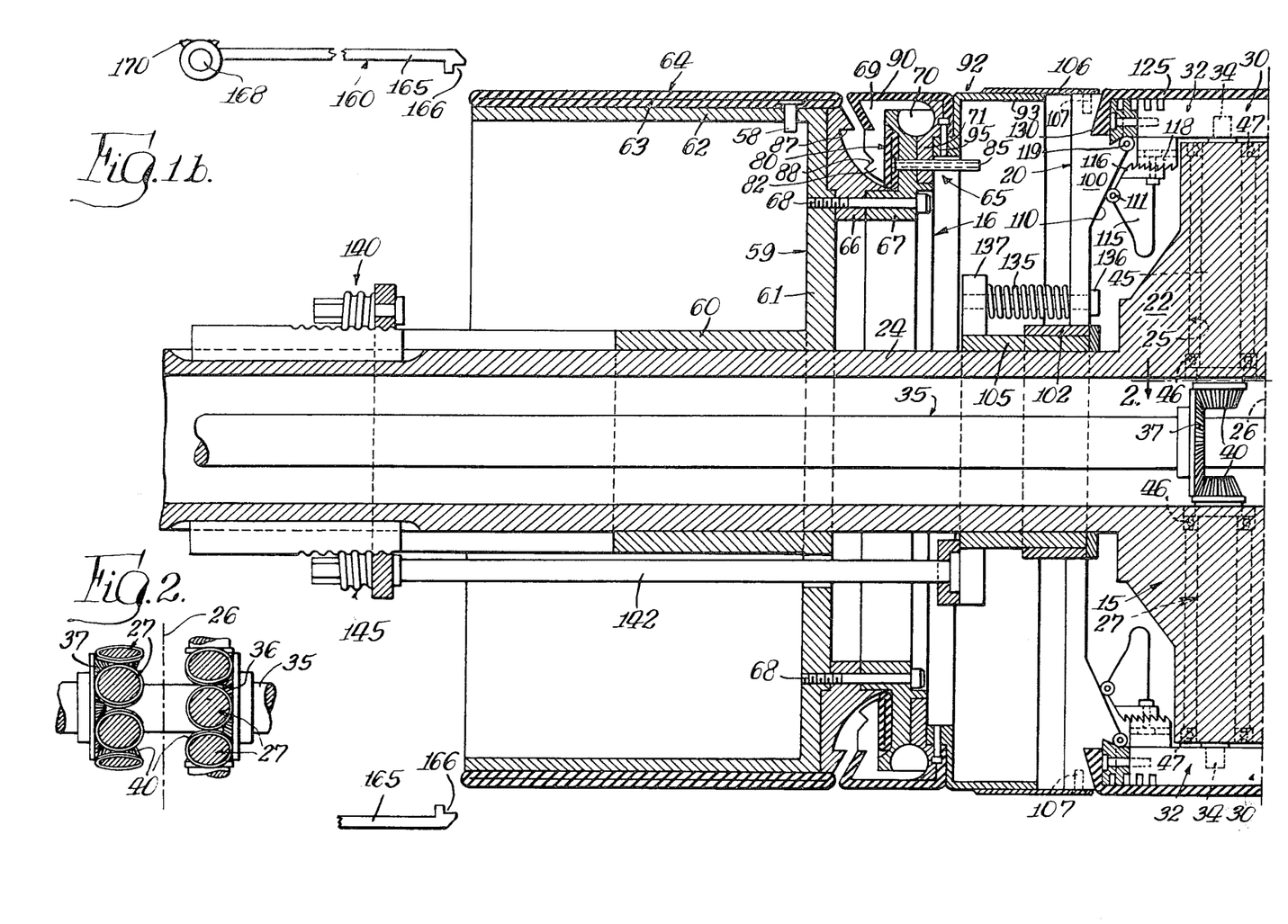
FIG. 2 is a detail sectional view taken on the line 2—2 of FIGS. 1a and 1b looking in the direction indicated by the arrows.

Referring now to FIGS. 1a and 1b of the drawings the tire building apparatus of the invention there shown comprises an intermediate assembly indicated at 15, left- and right-hand end assemblies 16, one at each end of the intermediate assembly 15, and gap shield frame means 20, one between each of the end assemblies 16 and the intermediate assembly 15.

Figure 3:
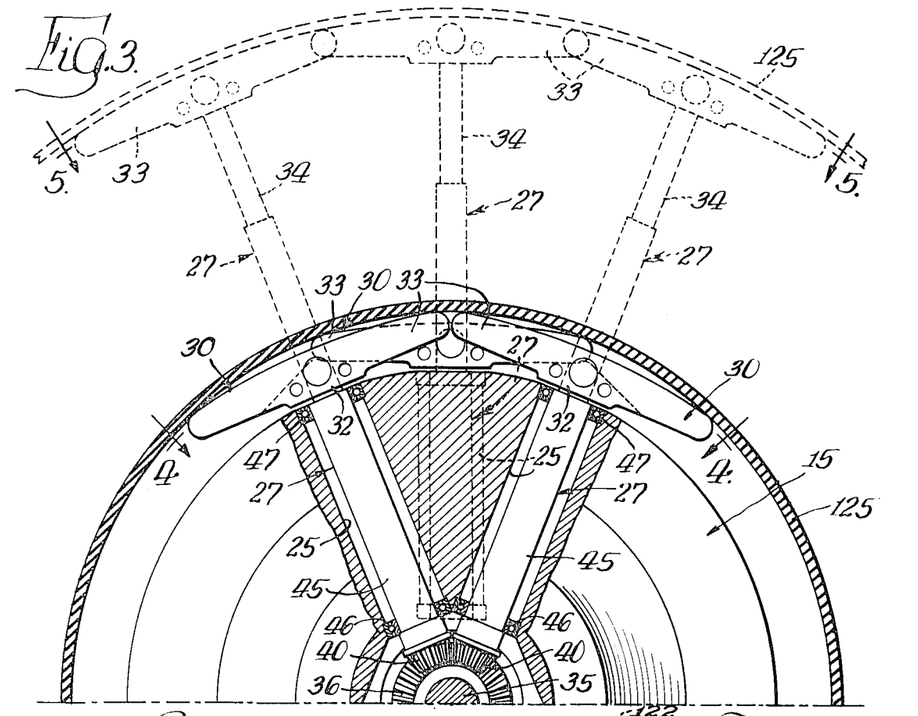
FIG. 3 is a vertical sectional view taken on line 3—3 of FIG. 1a looking in the direction indicated by the arrows, and showing in dotted lines the positions of the parts in the radial outer positions of the intermediate supporting members of the intermediate assembly.
Figure 4:
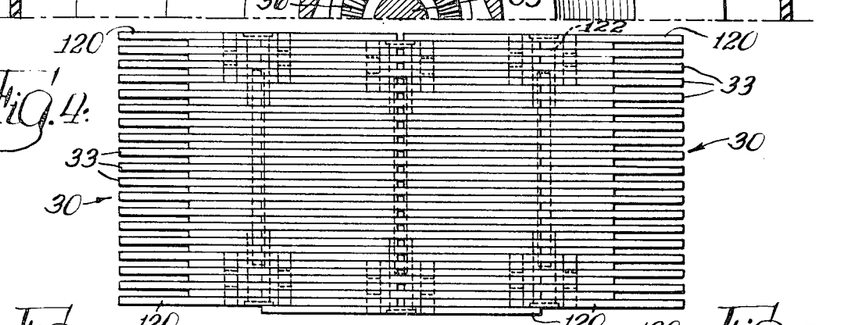
FIG. 4 is a plan view of the intermediate assembly taken along the line 4—4 of FIG. 3 with the intermediate supporting members in their radial inward positions.
Figures 5, 6:
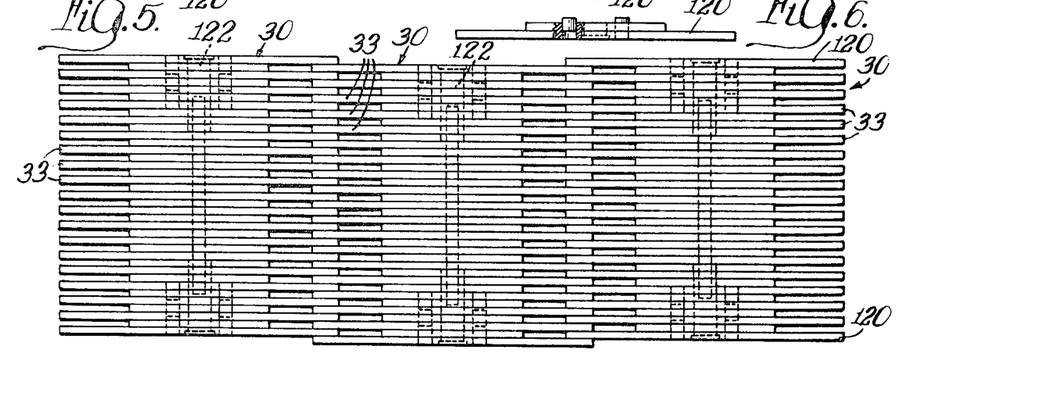
FIG. 5 is a plan view of the intermediate assembly taken along the line 5—5 of FIG. 3 with the intermediate supporting members in their radial outer positions.
FIG. 6 is a plan view, partly broken away, showing an intermediate supporting member adapted to be associated with the intermediate assembly for adjusting the width of the intermediate assembly.

The intermediate assembly 15 comprises a hub member 22 intermediate the ends of a hollow shaft 24 and which hub member is formed with a plurality of radially extending bores 25 lying alternately to opposite sides of the center line 26 of the hub. The several bores 25 each receive screw means 27, one for each of a plurality of circumferentially arranged intermediate sections 30 of the intermediate assembly 15. As best in FIGS. 1a, 3, 4 and 5 each intermediate section 30 comprises a body portion 32 having a plurality of axially spaced apart intermediate supporting members or blades 33, and in which the intermediate supporting members or blades 33 of circumferentially adjacent intermediate sections 30 are interleaved, with the ends of the intermediate supporting members 33 of one intermediate section fitting into the spaces between adjacent blades of circumferentially adjacent intermediate sections. Each of the several intermediate sections 30 are mounted at the outer ends of an inner screw 34 of screw means 27 as best seen in FIGS. 1a and 1b for movement radially inwardly and outwardly in a manner to be described, and upon said radial inward and outward movement, the blades or intermediate supporting members also move circumferentially relative with respect to each other so that the outer surface of the intermediate assembly, depending upon the radial inward and outward positions of the several intermediate sections, define supporting surfaces of different diameters. As best seen in FIG. 3, the outer surfaces of the intermediate supporting members or blades 33 have a convex configuration to provide substantially cylindrical supporting surface in the radial inward and outward positions of the several intermediate sections.

Drive shaft means 35 supported for rotation in suitable bearings (not shown) and driven from a power source (not shown) extends axially within the hollow sleeve 24 and intermediate its ends is provided with bevel gears 36 and 37 for rotation by the drive shaft means 35, and which bevel gears have meshing engagement with bevel gears 40 carried at the inner ends of the screw means 27 with the screw means 27 being appropriately of left or right-hand thread so that upon rotation of drive shaft means 35 the several screw means are all conjointly driven radially inwardly or outwardly depending upon the direction of rotation of the drive shaft means 35. To this end and, as aforementioned, the bores 25 and the screw means 27 lying thereon are, as best seen in FIG. 2, 2disposed alternately at opposite sides of the center line 26 of the hub 22 of the intermediate assembly 15.

Referring again to FIGS. 1a, 1b and 3 it will be seen that each of the screw means 27 comprises an internally threaded sleeve 45 secured at its inner end to its associated bevel gear 40 and journaled for rotation at its opposite ends in inner and outer bearing assemblies 46 and 47 in the bore 25 of hub 22. A first hollow screw member 50, best seen in FIG. 3, has threaded engagement with the inner threads of the sleeve 45, and the inner screw 34 the outer end of which is connected to an intermediate assembly 30 has threaded engagement in the screw member 50 to provide upon rotation of drive shaft means 35 in one direction in the position of the parts shown in FIGS. 1a and 1b, to first radially outwardly advance the screw 50 followed by radial outward advancement of the inner screw 34 to dispose the intermediate sections to their radially outermost positions and at which relative circumferential movement of the intermediate supporting members or blades 33 has been effected so that the outer surfaces of the several intermediate assemblies form a substantially cylindrical supporting surface of maximum diameter as indicated in dotted lines in FIG. 3 and in FIG. 5. Upon rotation of drive shaft means 35 in the other or opposite direction, the several intermediate supporting sections return to the positions shown in full lines in FIG. 3 and FIG. 4 with the outer surfaces defining a substantially cylindrical supporting surface of minimum diameter.

The aforementioned end assemblies 16 each comprise end frames 59 having an annular hub portion 60 journaled on the outer periphery of the hollow shaft 24 from which an annular web 61 extends to an axially outwardly extending outer supporting flange 62 for supporting inflatable ply turnup bag means 63 of ply turnup means 64. A conduit 58 having connection with a source of fluid under pressure (not shown) provides for admitting fluid under pressure into bag means 63 to inflate the same or to establish bleed to deflate bag means 63.

The end frames 16 also provide for the support of tire bead shoulder forming means indicated at 65. The tire bead shoulder forming means 65 comprises annular ring members 66 and 67 secured by a plurality of bolts 68 to the annular web 61 of the end frames 59 between the end assemblies 16 and the intermediate assembly 16. The opposed surfaces of the annular members 66 and 67 provide a chamber for the reception of a plurality of circumferentially arranged shoulder members 69 pivoted on pins 70 supported between the annular member 67 and an annular pivot forming member 71. An inflatable tire bead shoulder bag means 80 is disposed between the annular ring member 67 and a leg 82 of the shoulder member 69. A conduit 85 having connection with a source of fluid under pressure (not shown) has connection with the inflatable tire bead shoulder bag means 80 and provides for admission of fluid under pressure into the inflatable bag means 80 to effect outward pivotal movement of the shoulder members 69 about the axis of pins 70 and upon bleed to return to the position shown in FIGS. 1a and 1b for purposes to be described. The annular member 66 is formed with a stop shoulder 87 adapted to be engaged by a stop shoulder 88 on leg 82 of the shoulder member 69 to limit outward pivotal movement of the shoulder member 69. Preferably the several circumferentially arranged shoulder members 69 have their outer peripheries enclosed in an annular rubber sleeve or cover 90.

The end assemblies 16 each further comprise an annular supporting member 92 having an axially inwardly extending flange portion 93 defining a supporting surface, and in which the annular member 92 is secured to the member 71 by a plurality of bolts 95. The flange portion 92 extends axially toward the intermediate assembly 15 to provide a supporting surface for a tire carcass material mounted on the apparatus.

Each gap shield frame means 20 comprises an annular member 100 supported adjacent its inner end on a collar 102 mounted for axial sliding movement on a collar 105 secured to the hollow shaft 24. Gap shield means 106 is supported at the outer end of the gap shield frame means 20 and is secured thereto by a plurality of screws 107. The annular member 100 of gap shield frame means 20 comprises a cam surface 110 extending outwardly and toward the intermediate assembly 15 for engagement by a cam follower 111 carried by a radially inwardly extending carrier member 115 mounted inwardly of the intermediate assemblies 30. The outer end of member 115 is provided with a toothed portion 116 for engagement with correspondingly toothed portion of an anchor member 118 extending radially inwardly of the intermediate sections 30 for adjusting the axial positions of the members 115. The cam member 110 of gap shield frame 20 at the upper end of the cam surface 110 carries a cam follower 119 the purpose of which will be hereinafter described.

Upon reference again to FIGS. 3, 4, 5 and 6 it will be noted that the intermediate sections 30 each may further comprise end intermediate supporting members or blades 120 detachably secured to the intermediate assemblies by bolts 122 to provide for adjusting the width of the intermediate sections. An annular rubber sleeve 125 surrounds the peripheries of the several intermediate sections 30 which desirably may be formed at its outer end edges with tapered wing portions 130 which, as it will be noted taper in width radially inwardly of the outer peripheries of the intermediate sections 30.

Each gap shield frame means 20 is normally spring biased toward the intermediate assembly 15 by means of spring means 135 disposed around headed studs 136 threaded at their inner ends in an annular flange 137 secured to the fixed collar 105 for purposes to be described.

The aforementioned gap shield means 106 is arranged to have telescopic sliding engagement with the annular supporting member 93 of the end assembly 16 for purposes to be described.

The aforementioned end assemblies 16 are mounted for axial sliding movement on the hollow shaft 24 to dispose the components of the end assemblies 16 in predetermined relation with respect to the intermediate assembly 15 with the end assemblies 16 being adapted to be axially advanced or retracted through screw adjustment means indicated generally at 140. Also, as seen in FIGS. 1a and 1b the gap shield frame means 20 are adapted to be adjusted axially through shafts 142 connected to the annular ring members 137 to be axially advanced or retracted through screw means 145. The screw means 140 thus provides for the desired positioning of the end assemblies 16 with respect to the intermediate assembly 15 and the screw means 145 provide for the selective adjustment of the position of the gap shield frame means 20 with respect to the intermediate assembly 15 and the end assemblies 16. The aforementioned telescopic relationship of the gap shield 106 and the supporting member 92 provides for relative axially adjusting the positions of the components as aforedescribed. In the position of the parts as shown in FIG. 1 the inflatable bag 63 carried by the annular supporting flange 62 when deflated has the outer peripheral surface thereof disposed so as to provide with the outer peripheral surfaces of the intermediate assembly 15, gap shield means 106 and the bead turnup means defining a substantially cylindrical surface for supporting tire carcass material therearound in the form of a tubular cylinder. The apparatus of FIG. 1 further comprises bead setting means indicated generally at 160 which comprises a plurality of circumferentially arranged bead segment members 165 formed at their inner ends with tire bead holding and supporting portions 166 with the segment members being pivoted at their opposite ends at 168 in frames 170 mounted for axial movement toward and away from the end assemblies 16.

Reference may now be had to FIGS. 7 through 20 for a description of the mode of operation of the foregoing described apparatus in constructing a pneumatic tire.

Figure 7:
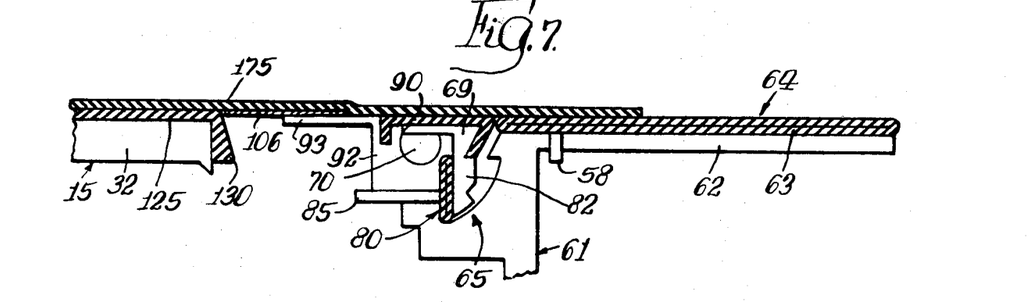
FIG. 7 is a right-hand upper corner quarter sectional view of the apparatus of FIG. 1a showing the parts in position for supporting tire carcass material in the form of a cylinder therearound.
Figure 8:
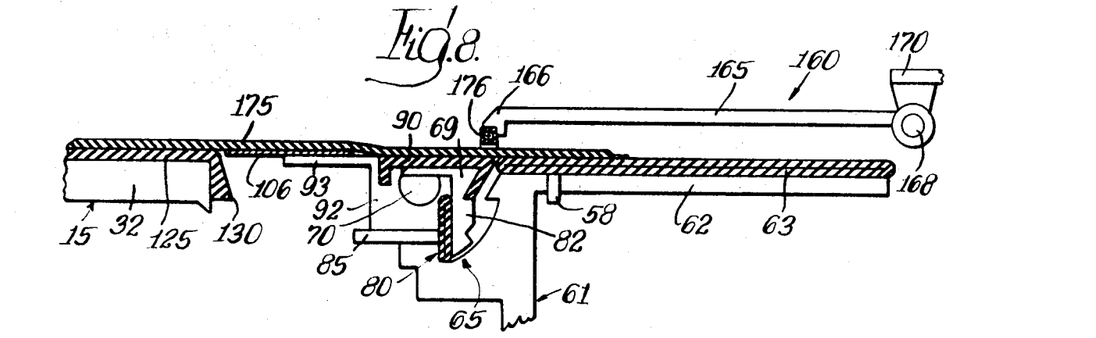
FIG. 8 is a view similar to FIG. 7 showing bead setting means for positioning a tire bead with respect to tire carcass material.
Figure 9:
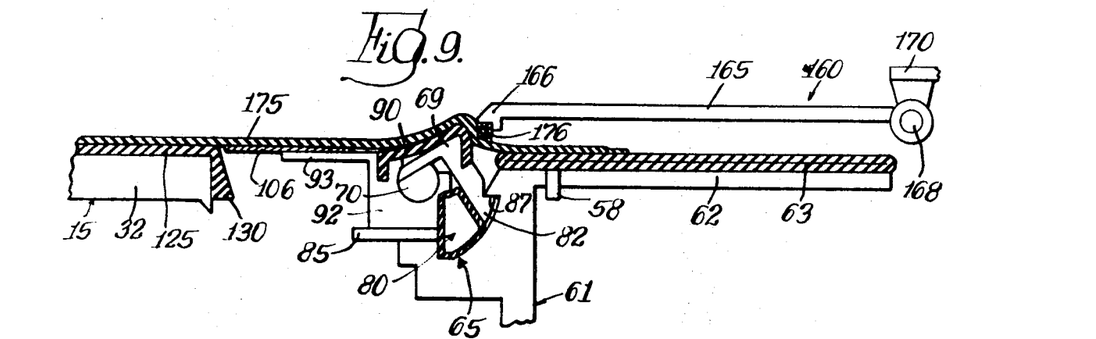
FIG. 9 is a view similar to FIG. 7 showing the tire bead shoulder forming means in operative position for forming a tire bead shoulder in the tire carcass material.
Figure 10:
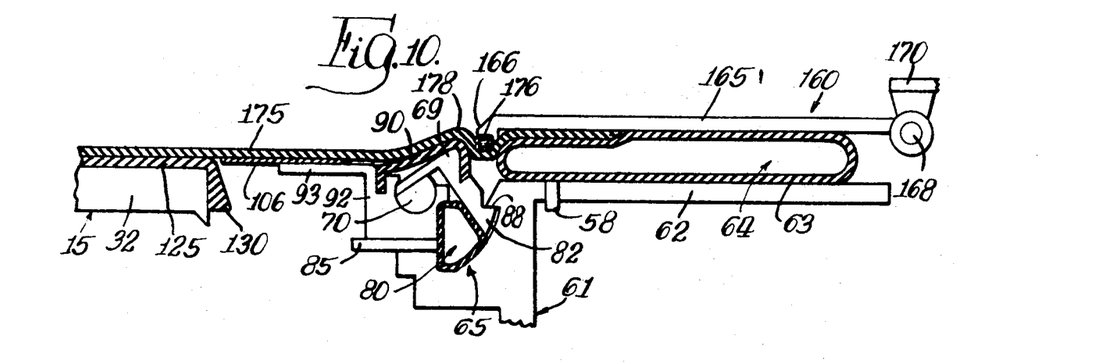
FIG. 10 is a view similar to FIG. 9 and showing ply turnup means initially actuated to displace an end portion of the tire carcass material to encase a major portion of a tire bead.

As shown in FIG. 7, the several components are in the positions thereof shown and described in connection with FIGS. 1a and 1b, and in which the intermediate assembly 15, gap shield means 106, annular supporting member 92, bead shoulder forming means 65, and the inflatable bag 63 of ply turnup means 64 are in positions defining a substantially cylindrical surface for supporting suitable tire carcass material 175 in the form of a tubular cylinder. Thereafter, the bead segment members 165 as shown in FIG. 8 provide for the support of a tire bead 176 at the inner ends thereof, and with the bead setter means 160 having been moved axially inwardly to support the tire bead 176 in fixed concentric and spaced relation of the tire carcass material at a predetermined position inwardly of the outer end of the tire carcass material. With the tire beads thus being held in predetermined spaced relation inwardly of the ends of the tire carcass material and in fixed concentric spaced relation with respect to the outer surface of the tire carcass material, tire bead shoulder forming means 65, as shown in FIG. 9, is actuated by admission of fluid under pressure through conduit 85 into inflatable bag 80 displacing the outer ends of shoulder members 69 radially outwardly to form an annular bead shoulder in the tire carcass material as indicated at 178. The bead segment members 165 hold the tire beads against such bead shoulders, and with the tire beads thus held against axial movement toward each other, the inflatable bag 63 of ply turnup means 64 is initially inflated as seen in FIG. 10 to displace a portion of the end portions of the tire carcass material to encase a major portion of the tire bead 176.

Figure 11:
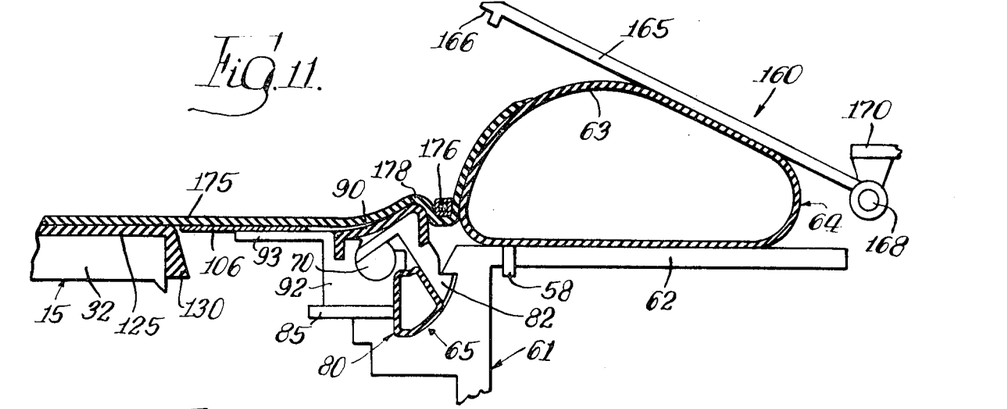
FIG. 11 is a view similar to FIG. 10 showing the bead setting means moving to retracted position and the ply turnup means further actuated to further displace the end portion of the carcass material around the tire bead.
Figure 12:
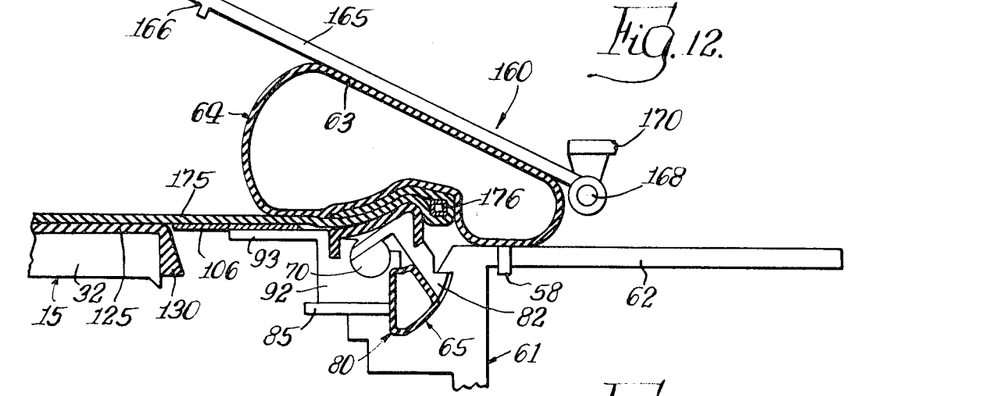
FIG. 12 is a view similar to FIG. 11 showing the bead setting means and ply turnup in position for fully encasing the tire bead with the end portion of the tire carcass material.

Upon continued inflation of inflatable bag 63 the inner ends of the bead segments move outwardly, as shown in FIG. 11 about the pivots 168 of the bead setters to continue to displace the outer end portions of the tire carcass material around the tire beads. The frame 170 supporting the bead segment members is then moved axially inwardly, and as shown in FIG. 12, effects displacement of the inflated ply turnup bag 63 to fully encase the bead 176 in the end portion of the tire carcass material. After completing encasing of the tire beads in the end portions of the tire carcass material, the bead setting means 160 are returned to normal position by movement of frame members 170 axially away from each other. Thus in the position of the parts as shown in FIG. 13, the tire bead 176 has been fully encased in the end portion of the tire carcass material, and the bead setter segments 165 have been retracted axially outwardly away from the bag 63 and the bag 63 deflated.

Figures 13, 14:
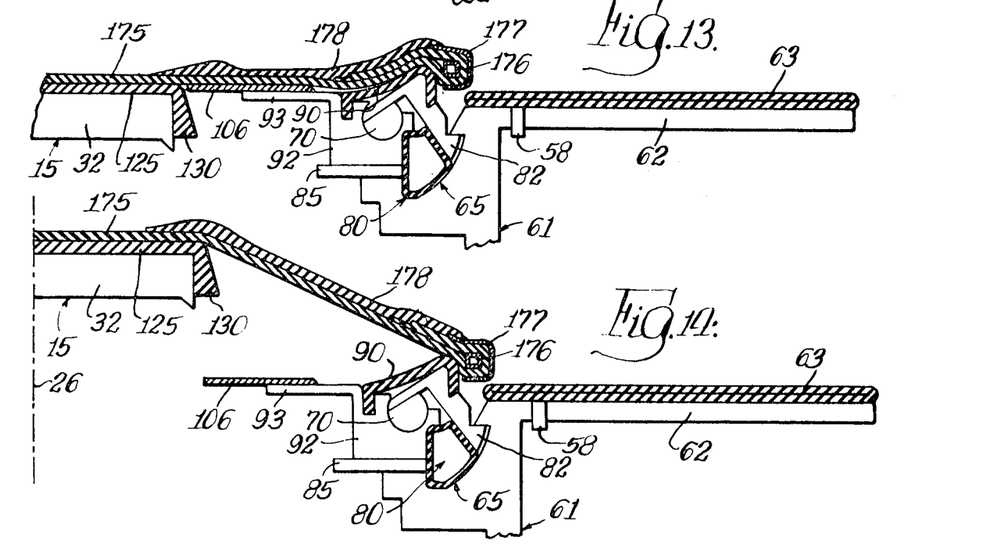
FIG. 13 is a view similar to FIG. 12 but showing the ply turnup means in its initial position, with the bead setting means having been axially moved outwardly away to inoperative position, and with the tire bead shoulder forming means in operative position for the application of components of tire such as chafer strips and sidewalls.
FIG. 14 is a view similar to FIG. 13 showing initial radial outer movement of the intermediate assembly and with the bead shoulder forming means in operative position to tension the tire carcass material being the intermediate assembly and the encased tire beads.
Figures 15, 16, 17:
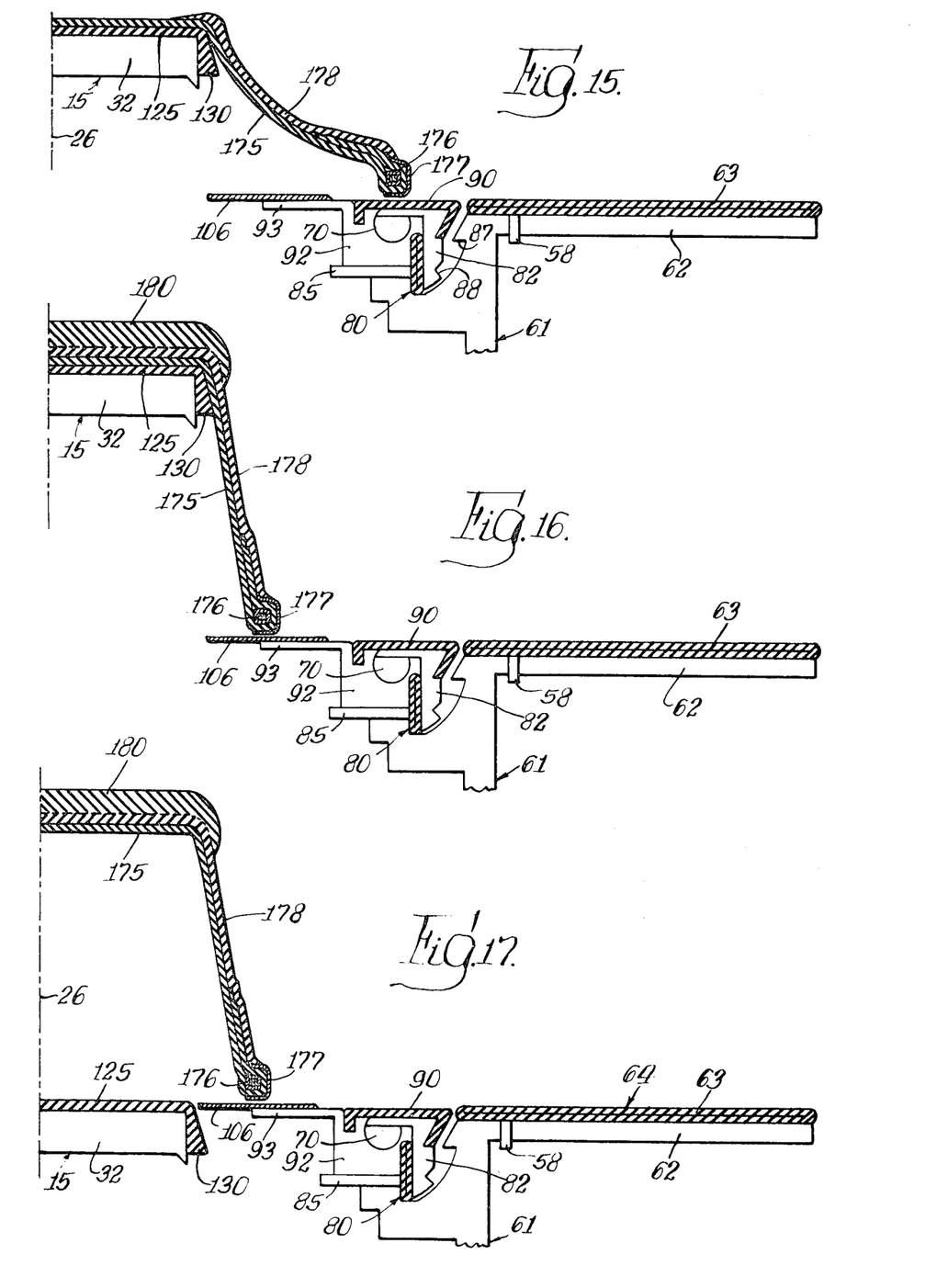
FIG. 15 is a view similar to FIG. 14 showing the tire bead shoulder forming means in retracted position freeing the encased tire beads for axial movement toward each other in the further radial outward movement of the intermediate assembly.
FIG. 16 is a view illustrating the formed tire carcass and with the intermediate assembly in its radial outermost position at which the tire carcass material is in the form of a torus and approximating the configuration of a tire.
FIG. 17 is a view similar to FIG. 16 illustrating the formed carcass and with the intermediate assembly in its initial or starting position and at which the completed carcass may be removed by sliding it endwise off of the apparatus.

As will be seen in FIG. 13 of the drawings the encased tire bead 176 and the enclosing end portion of the tire carcass material are firmly supported by the bead shoulder forming means 65 to enable the incorporation of components such as a chafer strip 177 and a sidewall 178 as by stitching to the supported tire carcass material. After such additional components have been applied to the tire carcass material the intermediate assembly 15 may then be initially radially expanded as shown in FIG. 14 to begin forming the tire carcass material into substantially torus configuration. In the initial radial outward movement of the intermediate assembly 15 the bead shoulder forming means 65 are maintained in their bead shoulder forming positions to restrain axial movement of the tire beads toward each other which effects tensioning of the sidewall area of the tire carcass material between the intermediate assembly and the tire beads. After such initial tensioning of the sidewall areas the bag 80 of the bead shoulder forming means 65 is deflated to the position shown in FIG. 15 which effects release of the tire beads so that they move freely axially toward each other as the intermediate assembly continues to move radially outwardly from the position shown in FIG. 15 to the position shown in FIG. 16 in which the carcass material has been formed into torus configuration approximating that of a completed tire. In the position of the parts as shown in FIG. 16, a thread and/or tread components, as 180, may be applied to the outer periphery of the intermediate portion of the tire carcass material. The intermediate sections 30 in their radially extended positions provide a rigid and firm surface for effecting stitching of the tread components to the outer periphery or crown of the carcass thus formed. Following the application of the tread component 180 to the tire carcass, the intermediate assembly may be retracted to its position as shown in FIGS. 1a and 1b, and in FIG. 17 to enable removal of the completed carcass by shifting of the same axially off one of the ends of the apparatus.

After removal of the carcass assembly from the apparatus it may be molded and cured in the conventional manner to complete the tire.

Figure 18:
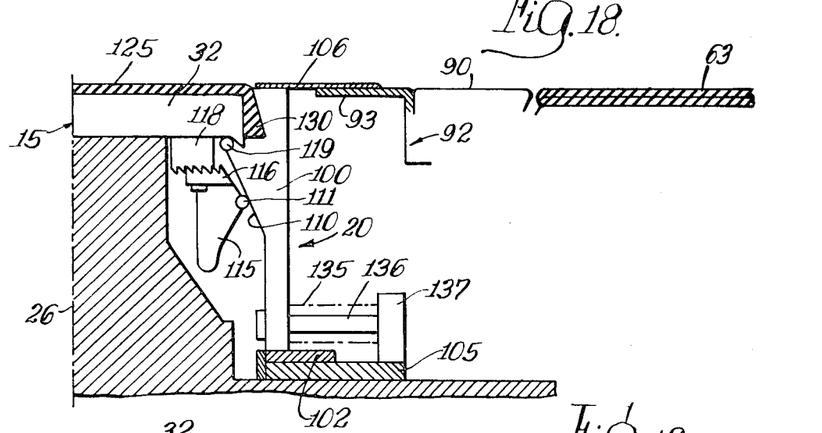
FIG. 18 is a view of the right-hand portion of the intermediate assembly and a portion of the adjacent end assembly in the initial position of the parts for applying carcass material to the drum.
Figure 19:
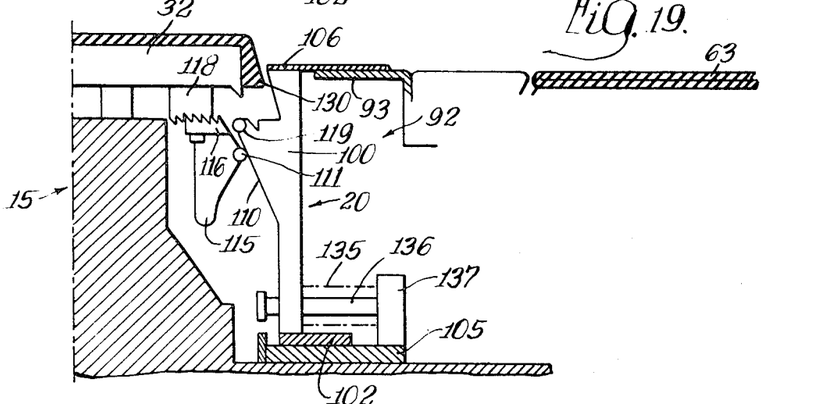
FIG. 19 is a view similar to FIG. 18 showing the position of the parts in which gap shield means is in retracted position to permit a tread wing component carried by the intermediate assembly in position for passage thereof radially outwardly of the cylindrical surface formed by the drum.
Figure 20:
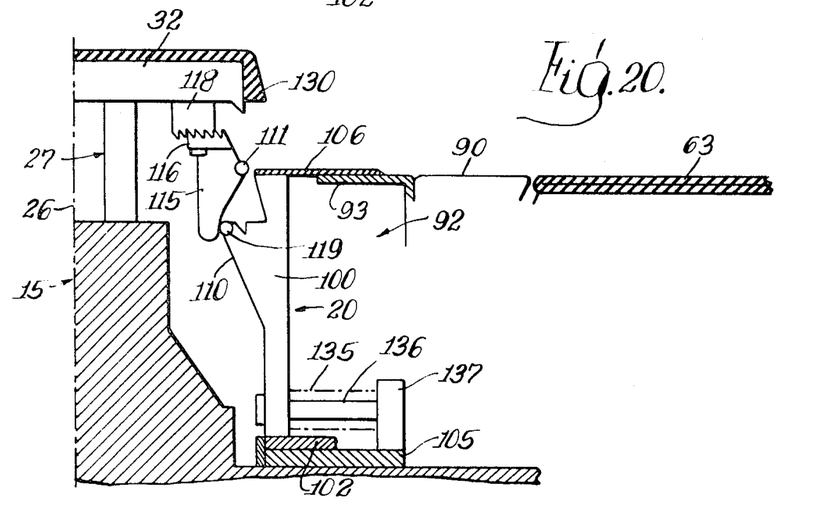
FIG. 20 is a view showing the gap shield means in its initial position and with the intermediate supporting members of intermediate assembly lying radially outwardly of the gap shield means.

Referring now to FIGS. 18 through 20 it will be seen that the components there shown provide for the provision of the utilization of the tread wing supporting component 130, which in the extended position of the intermediate assembly 15, provides for the ready stitching of the tread wing portions of a tread to the carcass. In FIG. 18 it will be observed that upon radial outward movement of the intermediate assembly 15 that the followers 111 mounted on carrier 115 ride on the cam surface 110 of the intermediate frame 20 moving the intermediate frame 20 axially outwardly against the force of the spring means 135 to the position shown in FIG. 19 in which the wider end of the tread wing component 130 clears the inner edge of the gap shield 106 by effecting shifting of the gap shield 106 axially outwardly on the supporting member 93. Upon continued radial outward movement of the intermediate assembly 15 cam follower 119 carried by the gap shield frame means 20 passes follower 111 enabling the loaded spring means 135 to return the gap shield frame means 20 to its normal or initial position so that the intermediate assembly may continue its outer radial movement to the position in which the tread component 180 is applied to the carcass. Upon radial inward movement in the intermediate assembly 15 from its outermost position to its inner position, the cam surface 123 of carrier member 115 engages the follower 119 to shift gap shield frame means 20 axially outwardly to permit the tread portion 130 to pass radially inwardly of the inner edge of the gap shield 106.

The above-described apparatus affords considerable latitude in building tires of many different dimensions by reason of the foregoing expedients for adjusting the width of the intermediate assembly, and providing for adjusting the axial spacing of the tire bead shoulders. Also, in the apparatus described the gap shield at 106 may be readily detached and a gap shield of other desired axial extent may be substituted. Further the supporting member 92 is readily removable so that members having supporting portions 93 of different axial extent may be substituted therefor. In addition the adjustable mounting of carrier member 115 enables the utilization of a variety of wing tread supporting members 130. The screw-adjusting means for the gap shield frame means 20 and for the end assemblies 16 provides considerable flexibility in utilization of the apparatus for building many sizes of tires.

While there has been shown and described a preferred embodiment of the invention, it will be understood that various modifications and rearrangements may be made therein without departing from the spirit and scope of the invention.

The invention claimed is:

1. Apparatus for building pneumatic tires comprising an intermediate assembly defined by a plurality of interleaved intermediate supporting members movable radially inwardly and outwardly between inner and outer end positions, and circumferentially relative to each other to form supporting surfaces of varying diameters, and end assemblies one mounted in fixed axial relation at each end of said intermediate assembly the outer surfaces of which at the radial inward positions of said intermediate supporting members together with the outer peripheral surfaces of said intermediate supporting members define a substantially cylindrical supporting surface for supporting tire carcass material in the form of a tubular cylinder thereon, and said intermediate supporting members in their radial outer positions forming the tire carcass material into substantially torus configuration, said end assemblies each comprising an end frame, tire bead shoulder forming means carried by each of said end frames, means for radially displacing said tire bead shoulder forming means to form tire bead shoulders inwardly of the ends of the tire carcass material, tire bead setting means for applying tire beads against said tire bead shoulders, said end assemblies each comprising ply turnup means for turning up the ends of the tire carcass material around the tire bead, means for said tire bead setting means for releasing the tire beads from the tire bead shoulders after initiating turning up the ends of the tire carcass material around the tire beads, said means for radially displacing said tire bead shoulder forming means after turning up of the ends of the tire carcass material around the tire beads being movable radially inwardly subsequent to initial movement of said intermediate supporting members in a direction for forming the tire carcass material into substantially torus configuration, whereby the released tire beads are moved axially toward each other upon continued radial outward movement of said intermediate supporting members from said initial movement thereof to their radial outer positions forming the tire carcass material into substantially torus configuration.

2. The apparatus of claim 1 in which said tire bead setting means comprises a plurality of bead segment members disposed circumferentially outwardly of said end assemblies having inner ends for holding tire beads in concentric spaced relation with and against said tire bead shoulders.

3. The apparatus of claim 2 in which said end assemblies include inflatable bag turnup means supporting opposite end portions of said tire carcass material, and in which said inflatable bag turnup means upon initial admission of fluid under pressure therein radially displace the carcass material thereon around a major portion of said tire beads.

4. The apparatus of claim 3 in which said bead segment members are pivotally mounted at their outer ends, and characterized by said inflatable bag turnup means upon further admission of fluid under pressure therein effecting pivoting of said bead segment members about their pivot axes to move the inner ends thereof outwardly away from said tire beads, and means for moving said bead segment members axially toward each other to bias said inflatable bag turnup means to turn up the ends of said carcass material thereon to encase said tire beads.

5. The apparatus of claim 1 in which said tire bead shoulder forming means comprise a plurality of shoulder members supported circumferentially upon said end frames, and bead shoulder inflatable bag means adapted upon admission of fluid under pressure therein to outwardly displace said shoulder members to form the tire bead shoulders in the carcass material.

6. The apparatus of claim 1 comprising means for axially adjusting the positions of said end frames with respect to each other for positioning said tire bead shoulder forming means in predetermined axially spaced-apart relation.

7. The apparatus of claim 6 in which said end frames comprise annular supporting portions extending axially inwardly away from said tire bead shoulder forming means.

8. The apparatus of claim 7 comprising gap shield frame means disposed between said end frames and said intermediate assembly, and gap shield means carried by said gap shield frame means together with said annular supporting portions of said end frames defining, in part, said cylindrical supporting surface.

9. The apparatus of claim 8 comprising means for effecting axial movement of said gap shield frame means between said intermediate assembly and said end frames.

10. The apparatus of claim 1 in which said intermediate assembly comprises a plurality of circumferentially arranged intermediate sections each of which comprise a plurality of said intermediate supporting members disposed in spaced-apart side-by-side relation with the intermediate supporting members of said intermediate sections being disposed in the spaces between the intermediate supporting members of adjacent intermediate sections.

11. The apparatus of claim 10 comprising rotatable drive shaft means, screw means connected to each of said intermediate sections, and gear means between said drive shaft means and said screw means for effecting radial inward and outward movement of said intermediate sections, respectively, by rotation of said drive shaft means in opposite directions.

12. The apparatus of claim 10 comprising means for detachably associating at least one of said intermediate supporting members for each of said intermediate sections to adjust the width of said intermediate assembly.

13. The apparatus of claim 1 comprising gap shield frame means mounted for movement between said end frames and said intermediate assembly, gap shield means carried by said gap shield frame means having the outer periphery thereof lying substantially in said cylindrical supporting surface, and gap shield moving means between said intermediate assembly and said gap shield frame means for moving the latter axially away from said intermediate assembly upon movement of said intermediate supporting members from their inner end position to their outer end positions.

14. The apparatus of claim 13 comprising spring means for biasing said gap shield frame means towards said intermediate assembly.

15. The apparatus of claim 13 in which said gap shield moving means includes means for permitting movement of said gap shield frame toward said intermediate assembly by said spring means at a predetermined position of said intermediate supporting members outwardly of the inner end positions of the latter.